United States Patent [19]

Mohr et al.

[11] Patent Number: 5,079,570
[45] Date of Patent: Jan. 7, 1992

[54] CAPILLARY RESERVOIR BINARY INK LEVEL SENSOR

[75] Inventors: John A. Mohr, San Diego, Calif.; Michael B. Lloyd, Boise, Id.; Scott W. Hock, San Diego; Mindy A. Hamlin, Oceanside, both of Calif.

[73] Assignee: Hewlett-Packard Company, Palo Alto, Calif.

[21] Appl. No.: 423,158

[22] Filed: Oct. 18, 1989

[51] Int. Cl.$^5$ .................... B41J 2/125; G01D 13/00
[52] U.S. Cl. ............................ 346/140 R; 73/323; 116/276
[58] Field of Search .............. 401/192; 222/155, 159; 346/140, 140 R; 73/323; 116/276

[56] References Cited

U.S. PATENT DOCUMENTS

| | | | |
|---|---|---|---|
| 3,708,798 | 1/1973 | Hildenbrand et al. | 346/140 |
| 4,015,272 | 3/1977 | Yamamori et al. | 346/140 |
| 4,376,490 | 3/1983 | Mizusaki | 73/323 |
| 4,380,772 | 4/1983 | Italiano | 346/140 |
| 4,604,633 | 8/1986 | Kimura et al. | 346/140 PD |
| 4,607,266 | 8/1986 | DeBonte | 346/140 PD |
| 4,610,202 | 9/1986 | Ebinuma et al. | 346/140 |
| 4,771,295 | 9/1988 | Baker et al. | 346/140 R |

*Primary Examiner*—Benjamin R. Fuller
*Assistant Examiner*—Alrick Bobb

[57] ABSTRACT

An ink level sensor (18, 18', 18'') is provided for detecting the level of ink in an ink cartridge (10) containing a capillary reservoir (14), such as foam, therein. The ink level sensor is a binary fluidic indicator, which provides both a human and machine readable indication of the level of the ink. A plurality of embodiments are described, including a two-port sensor (20), a one-port sensor (22), and a pair of fluidically-connected needles of different length (24).

6 Claims, 4 Drawing Sheets

Fig. 3.
Fig. 4.
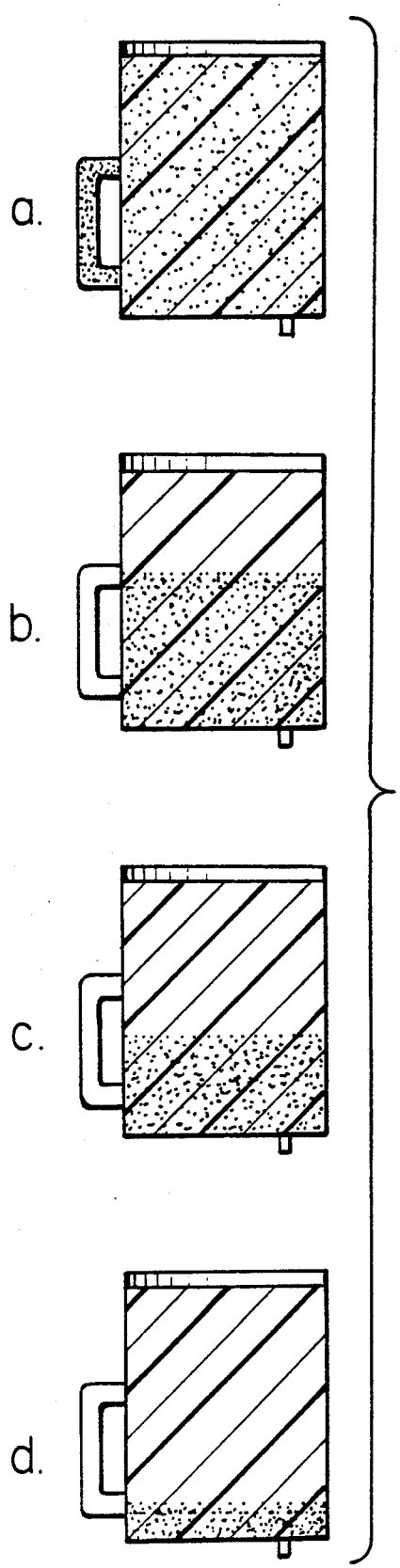
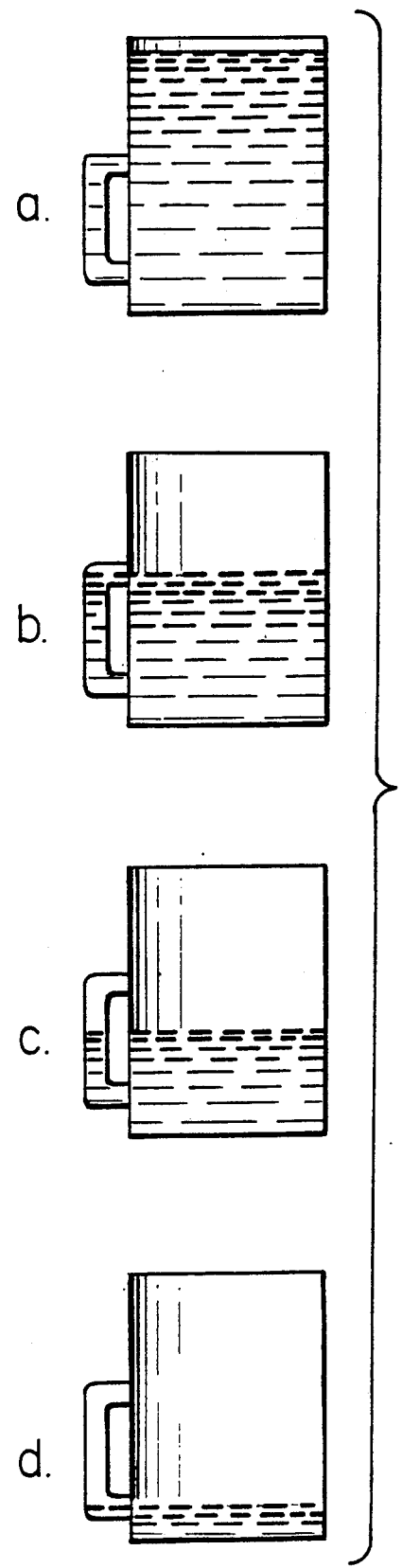
a.
b.
c.
d.

CAPILLARY RESERVOIR BINARY INK LEVEL SENSOR

TECHNICAL FIELD

The present invention relates to ink-printers, and, more particularly, to means for indicating the ink fluid level in ink cartridges used in such printers.

BACKGROUND ART

Ink-jet printers employ a reservoir of ink to supply a printhead. In thermal ink-jet printers, the printhead comprises a plurality of nozzles in a nozzle plate. Underneath each nozzle is a firing chamber, commonly fed with ink from a plenum connected to the reservoir. Ink is expelled through the nozzles by a resistor element in the chamber, which is energized in response to a signal from a microprocessor in the printer.

In such ink-jet printers, the reservoir and printhead are contained on a replacable unit referred to as a cartridge or pen. The reservoir portion itself is a foam, which has been loaded with ink. Negative pressure at the printhead ensures a continual supply of ink, so long as there is ink in the reservoir.

In the past, it has been practically impossible to detect the ink fluid level in foam-containing cartridges, or pens, due to the gradual change in appearance between the filled and the drained semi-wet portions of the foam. Yet, it would be helpful to the user of the printer to be able to readily ascertain whether there is sufficient ink. This is particularly true if a large print job is scheduled, since it is obviously a waste of time and ink to print part of a job and run out of ink during the printing thereof.

DISCLOSURE OF INVENTION

In accordance with the invention, an ink level sensor is provided for detecting the level of ink in an ink cartridge employing a capillary reservoir, such as foam. The sensor is a binary fluidic indicator which is fluidically coupled with the foam reservoir and is triggered when the fluid level in the foam reaches a certain prescribed level.

The ink level sensor of the invention eliminates the uncertainty as to whether the fluid level has reached the sensor and is both human and machine readable. This latter feature permits warning the user of an impending out-of-ink or low-on-ink condition.

BRIEF DESCRIPTION OF THE DRAWINGS

FIGS. 3a–d are cross-sectional views depicting the binary action of the invention, while FIGS. 4a–d are corresponding cross-sectional views depicting the analog action of a common liquid level indicator for comparison;

BEST MODES FOR CARRYING OUT THE INVENTION

Figure 1:
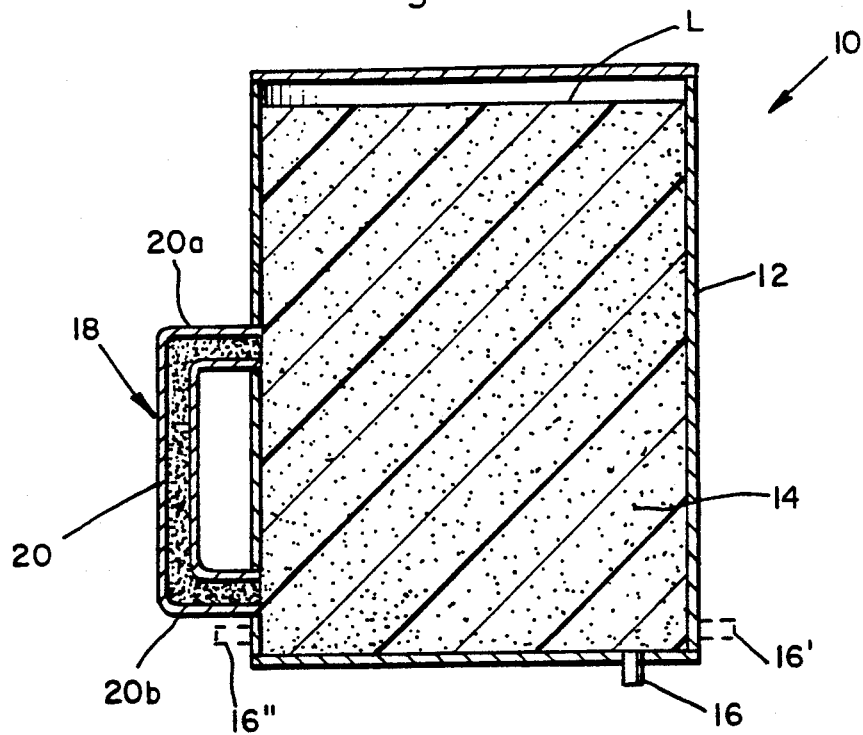
FIG. 1 is a cross-sectional view of a foam cartridge full of ink and including one embodiment of the ink level sensor of the invention.

Referring now to the drawings wherein like numerals refer to like elements throughout, an ink cartridge 10 is generally depicted in FIG. 1. The cartridge 10 includes a housing 12, within which is provided a foam reservoir 14 for storing a quantity of ink (in the drawing, the foam is stippled where there is ink and unstippled where there is no ink). At one end of the cartridge 10 is a printhead 16. Such printheads 16 and their fluidic connection (not shown) with the reservoir 14 have been extensively disclosed elsewhere, and since the printheads and their fluidic connection do not form a part of this invention, are not described further.

In accordance with the invention, an ink level sensor 18 is provided on one surface (here, side) of the housing 12. In the embodiment depicted in FIGS. 1 and 2, the sensor 18 comprises a C-shaped transparent tube 20, with one arm 20a a first distance above the printhead 16 and the other arm 20b a second, shorter distance above the printhead. The arms 20a and 20b are ported through the housing to the foam in two separate locations. Other embodiments of the sensor 18 will be discussed below.

The location of the printhead is not important, other than it be below the bottom arm 20b. Examples of other positions include 16' and 16" (shown in phantom in FIG. 1). Thus, it will be appreciated that the liquid level sensor of the invention is not position-sensitive.

Figure 2:
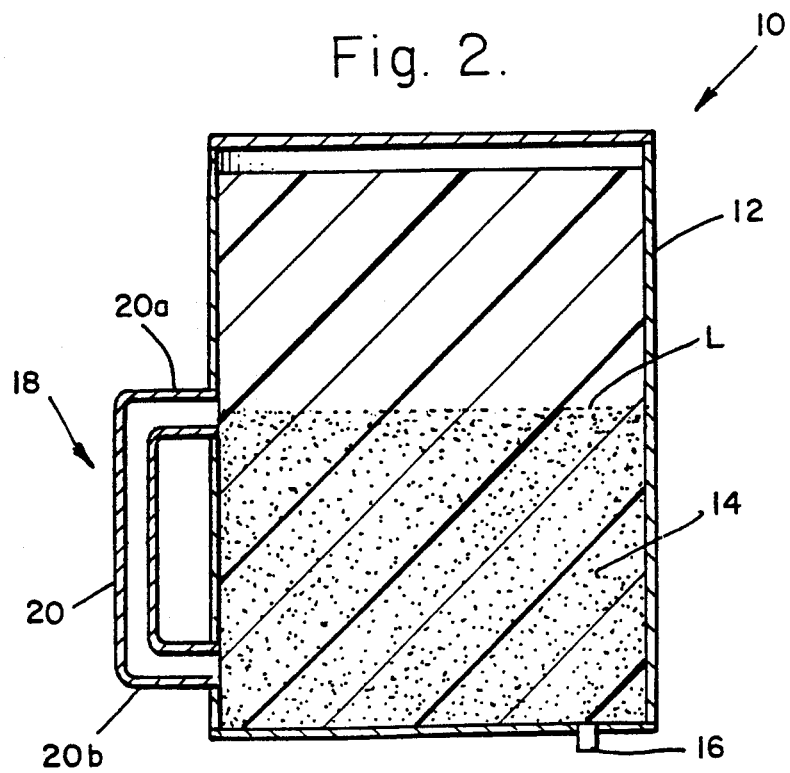
FIG. 2 is a cross-sectional view similar to that of FIG. 1, but showing a partially emptied foam cartridge.

The operation of the sensor of the invention is based on the principle of capillary pressure provided by pores in the foam and fluid dynamics. FIGS. 1 and 2 depict one type of ink level sensor 18 of the invention in its ON (FIG. 1) and OFF (FIG. 2) states. In the full foam pen, the ink level sensor 18 is full of ink and is in static equilibrium; the fluid level L (ink/air interface in the foam) is above the upper port 20a. However, when the level L of ink reaches the top port 20a, the ink is sucked from the ink level sensor into the foam due to an imbalance in the capillary pressures at the ink/air interfaces in the foam and the top port of the ink level sensor. The resulting sudden depletion of ink in the ink level sensor provides a binary fluidic indicator. Since the tube 20 is transparent, the change from full to empty is immediately apparent to both a (human) user and a machine sensing apparatus. In the latter case, various detection schemes are readily available, such as a light emitting source on one side of the tube 20 and a light detector on the other side, with the light blocked in the tube full condition and the light detected in the tube empty condition.

It will be thus apparent to those skilled in the art that the ink level sensor of the invention does not in any manner function like a liquid level sensor of the type found on coffee pots and the like. Rather, it is the interaction of the foam and the sensor that provides the essentially instantaneous change from ON to OFF, as the liquid level begins to drop below the upper port.

FIGS. 3a–d depict the essential binary nature of the level sensor of the invention, showing the foam full of ink (FIG. 3a), with the ink level just below the topmost portion of the upper port 20a (FIG. 3b), with the ink level about half-way between the two ports 20a and 20b (FIG. 3c), and with the foam essentially empty (ink level below the bottom port 20a; FIG. 3d). It is clearly seen that the level sensor of the invention acts as a binary fluidic indicator, with the tube 20 emptying as soon as the ink level begins to drop below the upper port 20a. This provides an immediate binary ON-OFF indicator.

For comparison, a common liquid level sensor, or slight glass such as used to indicate liquid level in coffee urns and steam bailers, is depicted in FIGS. 4a-d. The liquid level in each sub-figure corresponds to the liquid level in the corresponding sub-figure of FIG. 3. The analog nature of the common liquid level sensor is clearly seen, reflecting the particular level of liquid in each instance.

Figure 5:
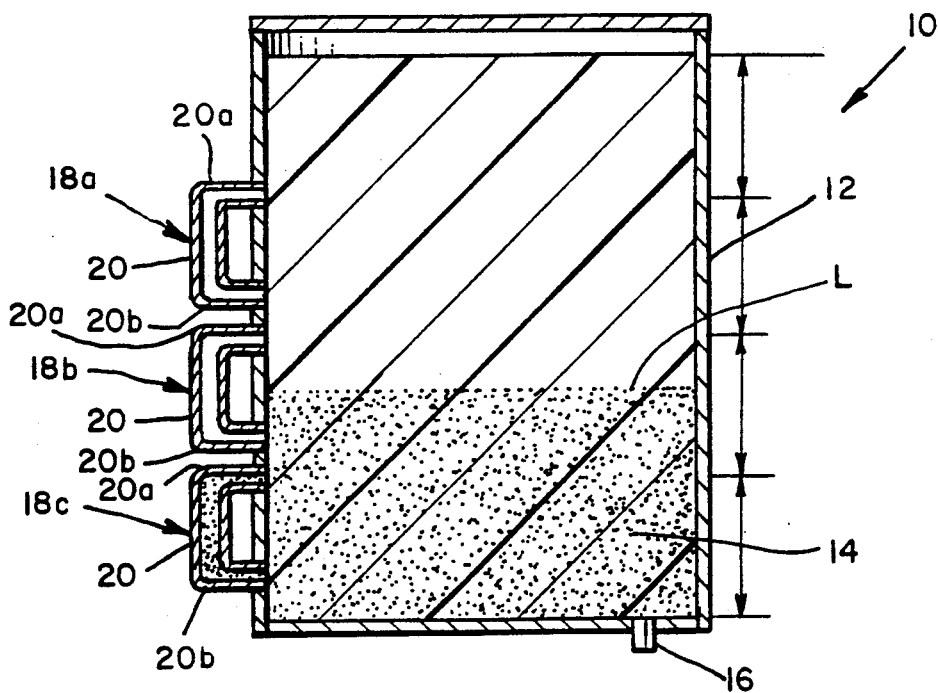
FIG. 5 is a cross-sectional view similar to that of FIG. 1, but depicting another embodiment of the invention, showing a plurality of ink level sensors.

Another embodiment which uses the foregoing two-port sensor 18 is depicted in FIG. 5. Here, a plurality of two-port sensors 18 is employed to indicate ¼ (18a), ½ (18b), and ¾ (18c) empty.

Figure 6:
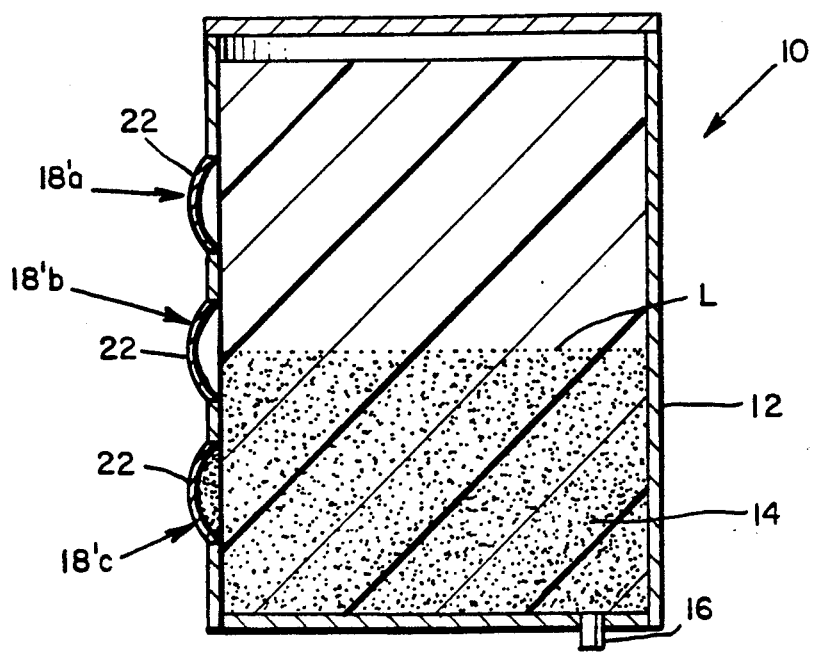
FIG. 6 is a cross-sectional view similar to that of FIG. 5, but depicting yet another embodiment of the invention, showing a plurality of ink level sensors.

In an alternative scheme, the sensor 18' may comprise a one-port device 22. Such a sensor 18' is depicted in FIG. 6, which, like FIG. 5, depicts a plurality of sensors to indicate various levels of empty. As the ink level L reaches the top of the one-port sensor, the capillary pressure at the ink/air interface in the foam sucks in all of the ink from the port. Like the two-port sensor 18, the one-port sensor 18' is both human and machine readable. Advantages of the one-port sensor over the two-port sensor are the ease of implementation (molded hole in the side of the cartridge sealed with transparent tape, for example) as well as the smaller size.

The one-port sensor 18' may comprise a transparent concavity not filled with foam 22, such as a plastic button of a material such as polymethacrylate or other transparent polymer or simply transparent tape, mounted on the side of the cartridge housing 12, above the printhead 16. Even if the tape is inadvertently removed, ink is immediately sucked into the foam by capillary pressure, thereby preventing any spillage of ink. The only adverse effect in such a situation would be loss of water by evaporation over a period of time, which would shorten the lifetime of the pen somewhat.

Use of the sensor of the invention permits refill of the foam reservoir, such as by a syringe. As the reservoir is refilled, the ink also refills the sensor, whether the two-port embodiment or the one-port version, thereby readying the sensor for the next cycle of printing from the ink in the foam reservoir 14. The cycle of largely depleting the reservoir, refill, and depletion may be repeated as necessary to extend the life of the cartridge 10, which has previously been limited to the first depletion of ink. The sensor of the invention permits the user to take advantage of the considerably longer lifetime of the printhead by recycling the foam reservoir every time the time-to-refill sensor is depleted, for example, ¾ empty.

Figure 7:
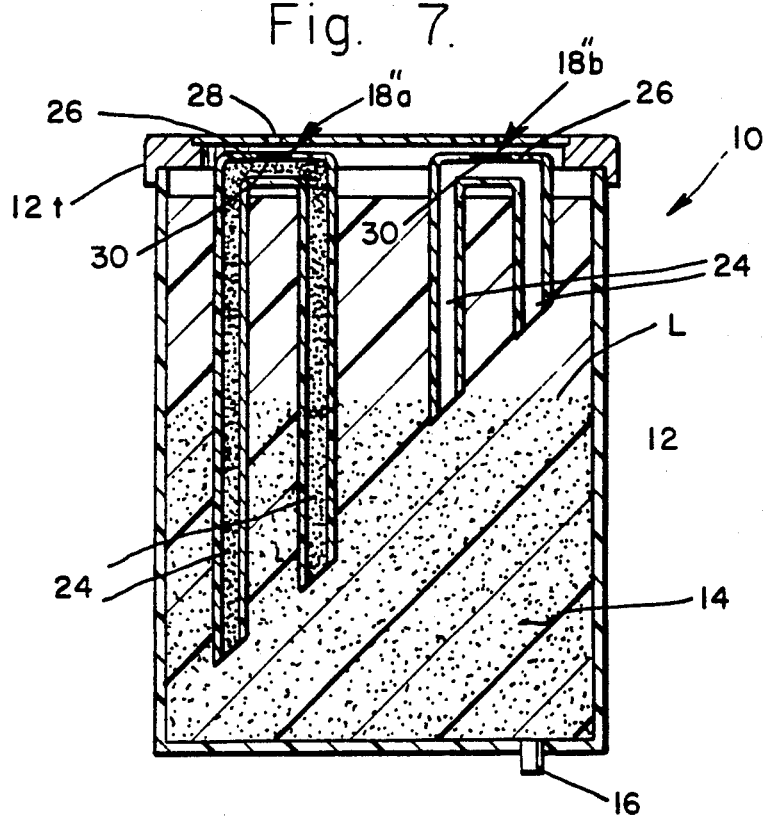
FIG. 7 is a cross-sectional view depicting still another embodiment of the invention, showing a plurality of ink level sensors, and taken along the line 7—7 of FIG. 8.
Figure 8:
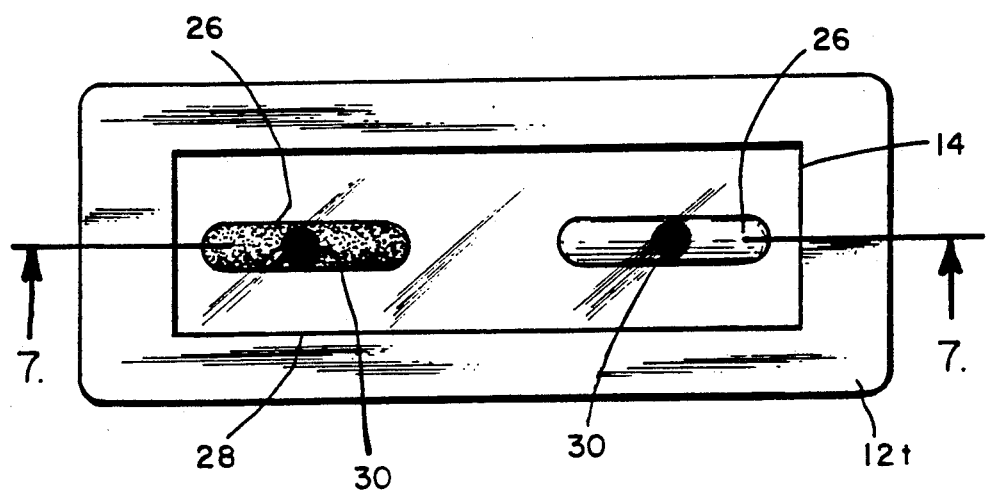
FIG. 8 is a top plan view of the embodiment illustrated in FIG. 7.

In connection with the use of syringes, FIGS. 7 and 8 depict yet another embodiment in which the sensor 18" comprises a pair of needles 24, one longer than the other, inserted in the foam reservoir 14 and fluidically connected by a transparent fluid connection, or tube, 26. The sensor 18" is mounted on the top surface 12t of the housing. The sensor 18" may be recessed in the top, with the top provided with a view window 28 for viewing the sensor.

Again, when the ink level drops below the shorter needle 24a, the ink in both needles is pulled into the foam, for the reasons given above. Consequently, the tube 26 is empty, thereby providing a visual indication of the level of ink.

As depicted in FIGS. 7 and 7b, a plurality of such sensors 18" may be provided, with each pair of needles 24 having different lengths to indicate the extent of emptiness of the foam.

An advantage of the approach depicted in FIGS. 7a and 8 is that it provides a ready mechanism for refilling the foam, since inlet means such as valves and septums 30 may be readily provided for injection of ink through the needles 24 into the foam.

The foregoing description has employed foam as the capillary reservoir. However, it will be readily apparent to those skilled in the art that the teachings of the invention apply to any capillary reservoir. Examples of other capillary reservoirs include (a) conventional felt pen fibers; (b) glass beads; (c) capillary tubes; and (d) rolled-up plastic film, to name a few.

INDUSTRIAL APPLICABILITY

The ink level fluid sensor of the invention is useful in cartridges used in ink-jet printers to indicate the level of ink remaining therein.

Thus, there has been disclosed an ink level fluid sensor for ink-jet printers in which the ink level in a foam-containing ink cartridge is determinable by simple visual or machine inspection. Various changes and modifications of an obvious nature may be made without departing from the spirit and scope of the invention, and all such changes and modifications are considered to fall within the ambit of the invention as defined by the appended claims.

What is claimed is:

1. In a device for dispensing a fluid stored in a capillary reservoir comprising a housing within which said capillary reservoir is contained for storing a quantity of liquid and on one end of which is mounted a means fluidically connected with said reservoir for dispensing said liquid, the improvement comprising at least one binary liquid level sensor mounted on said housing above said dispensing means and fluidically communicating with said capillary reservoir, wherein at least one of said binary liquid level sensor comprises a transparent C-shaped tube mounted on a side of said housing, with an upper port a first distance above said dispensing means and a lower port a second distance above said dispensing means, said second distance shorter that said first distance, both said ports fluidically communicating with said capillary reservoir.

2. The improvement of claim 1 comprising a plurality of said transparent tubes, spaced one above the other so as to provide a progressive indication of extent of emptiness of said capillary reservoir.

3. In a device for dispensing a fluid stored in a capillary reservoir comprising a housing within which said capillary reservoir is contained for storing a quantity of liquid and on one end of which is mounted a means fluidically connected with said reservoir for dispensing said liquid, the improvement comprising at least one binary liquid level sensor mounted on said housing above said dispensing means and fluidically communicating with said capillary reservoir, wherein at least one of said binary liquid level sensor comprises a plurality of transparent buttons mounted on a side of said housing above said dispensing means, said transparent buttons fluidically communicating with said capillary reservoir and spaced one above the other so as to provide a progressive indication of the extent of emptiness of said capillary reservoir.

4. In a device for dispensing a fluid stored in a capillary reservoir comprising a housing within which said capillary reservoir is contained for storing a quantity of liquid and on one end of which is mounted a means fluidically connected with said reservoir for dispensing said liquid, the improvement comprising at least one binary liquid level sensor mounted on said housing above said dispensing means and fluidically communicating with said capillary reservoir, wherein at least one of said binary liquid level sensor comprises a pair of needle-like members of different lengths extending into said capillary reservoir and fluidically connected above said capillary reservoir by means of a transparent tube.

5. The improvement of claim 4 comprising a plurality of said pairs of needle-like members, each pair having lengths different from other pairs to provide a progressive indication of extent of emptiness of said capillary reservoir.

6. In a device for dispensing a fluid stored in a capillary reservoir comprising a housing within which said capillary reservoir is contained for storing a quantity of liquid and on one end of which is mounted a means fluidically connected with said reservoir for dispensing said liquid, the improvement comprising at least one binary liquid level sensor mounted on said housing above said dispensing means and fluidically communicating with said capillary reservoir, wherein said capillary reservoir comprises foam.

* * * * *